US008960713B2

(12) United States Patent
Kim et al.

(10) Patent No.: US 8,960,713 B2
(45) Date of Patent: Feb. 24, 2015

(54) KNEE AIRBAG FOR VEHICLE AND FOLDING METHOD THEREOF

(71) Applicant: Autoliv Development AB, Vårgårda (SE)

(72) Inventors: Do-Gwan Kim, Hwasung (KR); Kyu-Soung Jang, Hwasung (KR)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 14/353,515

(22) PCT Filed: Oct. 9, 2012

(86) PCT No.: PCT/KR2012/008139
§ 371 (c)(1),
(2) Date: Apr. 23, 2014

(87) PCT Pub. No.: WO2013/062249
PCT Pub. Date: May 2, 2013

(65) Prior Publication Data
US 2014/0252750 A1 Sep. 11, 2014

(30) Foreign Application Priority Data
Oct. 25, 2011 (KR) .......................... 10-2011-0109503

(51) Int. Cl.
*B60R 21/16* (2006.01)
*B60R 21/237* (2006.01)
*B60R 21/206* (2011.01)
*B60R 21/231* (2011.01)
*B60R 21/00* (2006.01)

(52) U.S. Cl.
CPC .............. *B60R 21/237* (2013.01); *B60R 21/206* (2013.01); *B60R 2021/23169* (2013.01); *B60R 2021/0051* (2013.01)
USPC ................... 280/730.1; 280/743.1; 280/743.2

(58) Field of Classification Search
USPC ............................................ 280/730.1, 743.1
See application file for complete search history.

(56) References Cited

U.S. PATENT DOCUMENTS

| 7,207,594 B2 | 4/2007 | Igawa et al. |
| 7,232,153 B2 | 6/2007 | Kawauchimaru et al. |
| 7,549,671 B2 | 6/2009 | Mizuno et al. |

(Continued)

FOREIGN PATENT DOCUMENTS

| EP | 1481856 A2 | 12/2004 |
| JP | 2001-341602 A | 12/2001 |

OTHER PUBLICATIONS

International Search Report and Written Opinion of the ISA for PCT/KR2012/008139, ISA/KR, mailed Jan. 29, 2013.

*Primary Examiner* — Toan To
(74) *Attorney, Agent, or Firm* — Harness, Dickey & Pierce, P.L.C.

(57) ABSTRACT

A method of folding a knee airbag includes folding a lower portion of the knee airbag perpendicularly to a vertical central axis so that a lower end of the knee airbag is placed on the front panel of the knee airbag, individually folding both sides of the knee airbag toward the vertical central axis, and rolling an upper end portion of the knee airbag toward the lower portion of the knee airbag. The lower portion of the folded knee airbag is rapidly deployed toward the leg of an occupant in the initial deployment of the knee airbag, thereby minimizing time to ensure the minimum space between the instrument panel and the leg of the occupant and rapidly confining the leg of the occupant.

5 Claims, 9 Drawing Sheets

(56) References Cited

U.S. PATENT DOCUMENTS

| | | | |
|---|---|---|---|
| 7,878,540 B2 * | 2/2011 | Takimoto et al. | 280/743.2 |
| 7,954,845 B2 * | 6/2011 | Moritani | 280/730.1 |
| 8,220,830 B2 * | 7/2012 | Takimoto et al. | 280/730.1 |
| 8,272,666 B2 * | 9/2012 | Ohara | 280/728.2 |
| 8,302,991 B2 * | 11/2012 | Hong et al. | 280/730.1 |
| 8,505,963 B1 * | 8/2013 | Lewis et al. | 280/728.2 |
| 8,590,928 B2 * | 11/2013 | Spahn et al. | 280/739 |
| 8,684,400 B2 * | 4/2014 | Picard et al. | 280/730.1 |
| 8,777,262 B2 * | 7/2014 | Enders | 280/743.2 |
| 2009/0134611 A1 | 5/2009 | Wigger et al. | |

\* cited by examiner

[Fig. 1]
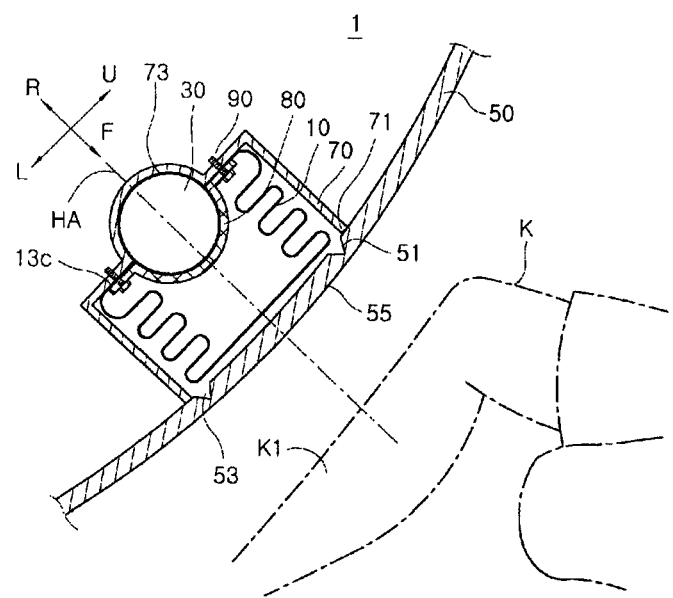
[Fig. 2]
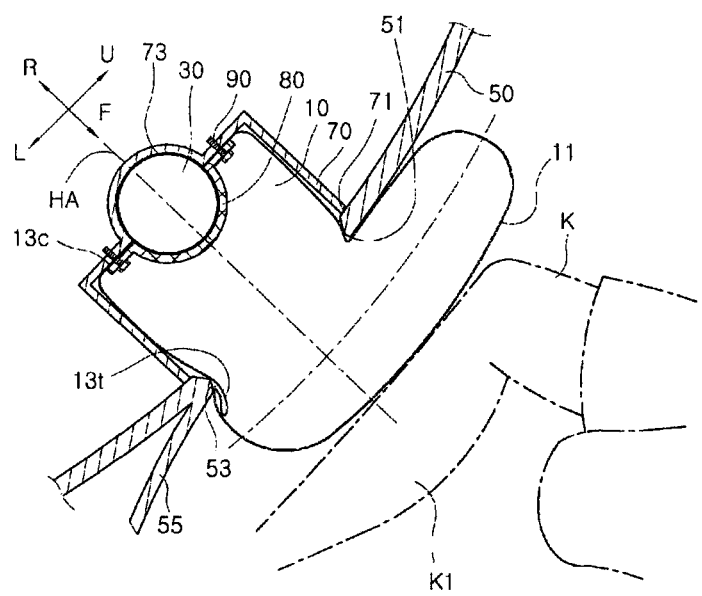

[Fig. 3]
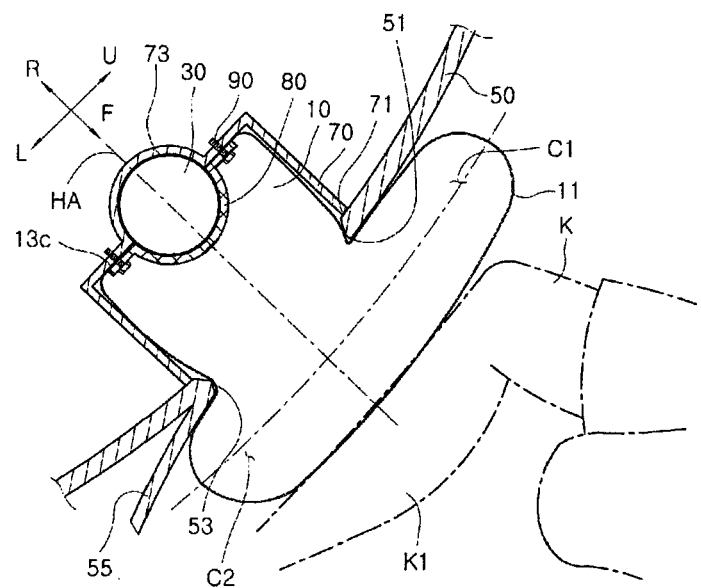
[Fig. 4]
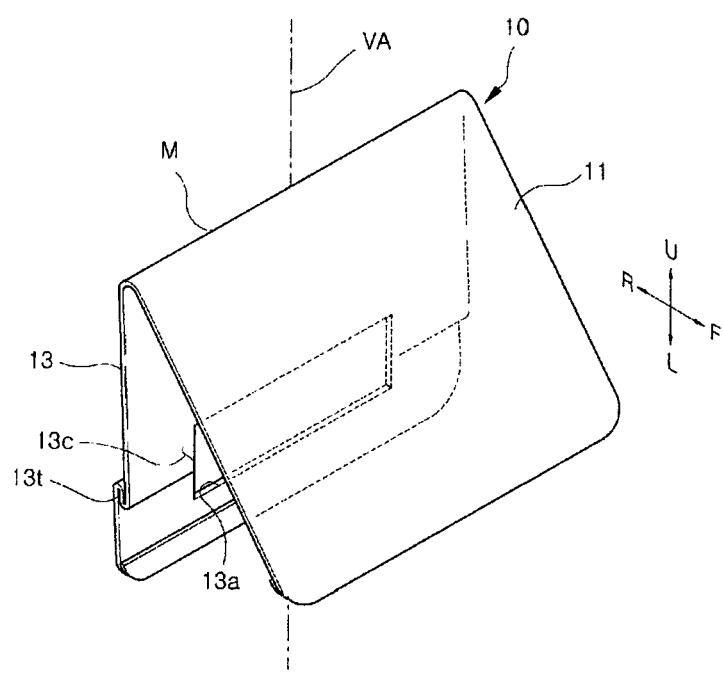

[Fig. 5]
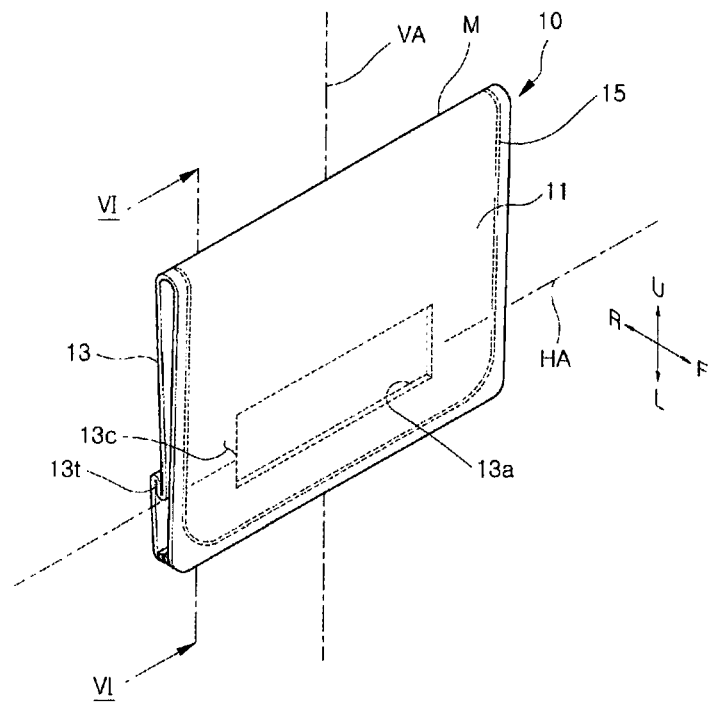
[Fig. 6]
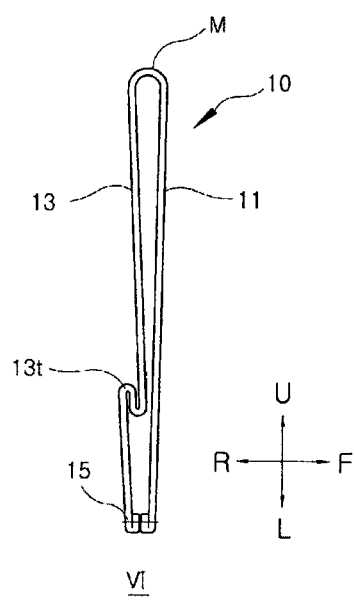

KNEE AIRBAG FOR VEHICLE AND FOLDING METHOD THEREOF

CROSS-REFERENCE TO RELATED APPLICATIONS

This application is a 371 U.S. National Stage of International Application No. PCT/KR2012/008139, filed Oct. 9, 2012, which claims priority to Korean Patent Application No. 10-2011-0109503, filed Oct. 25, 2011. The entire contents of the above applications are incorporated herein by reference.

TECHNICAL FIELD

The present invention relates to a vehicle safety device. In more particular, the present invention relates to an inflatable knee airbag for a vehicle, capable of protecting the knee of an occupant upon vehicle collision.

BACKGROUND ART

In general, a knee airbag module for a vehicle includes a knee airbag, which is installed at a lower portion inside an instrument panel to receive a steering wheel, received in a folded state, and deployed toward the knee of an occupant upon vehicle collision, and an inflator which supplies high-pressure gas to the knee airbag.

If impact is detected by a sensor upon vehicle collision, the inflator operates to supply high-pressure gas to the knee airbag. Since the knee airbag is deployed toward the knee of the occupant after being inflated in a predetermined volume due to high-pressure gas, the knee of the occupant is prevented from being damaged due to the collision with the instrument panel at the front thereof.

DISCLOSURE OF INVENTION

Technical Problem

Accordingly, the present invention has been made keeping in mind the above problems occurring in the prior art, and an object of the present invention is to provide a knee airbag for a vehicle, which can be deployed in upper and lower directions between a leg of an occupant and an instrument panel, so that the leg of the occupant extended downwardly from the knee of the occupant can be protected as well as the knee of the occupant.

Another object of the present invention is to provide a knee airbag for a vehicle, capable of minimizing time to ensure the minimum space between an instrumental panel and the leg of an occupant when the knee airbag is initially deployed.

Still another object of the present invention is to provide a knee airbag for a vehicle, capable of preventing the airbag from being caught between two legs of an occupant when the knee airbag is deployed.

Solution to Problem

In order to accomplish the above objects, according to one aspect of the present invention, there is provided a knee airbag for a vehicle, which is received in a folded state inside a vehicle body facing a knee of an occupant and deployed toward the knee of the occupant by gas inflated from an inflator upon vehicle collision. The knee airbag includes a front panel directed toward the knee of the occupant and a rear panel which is directed in an opposition direction to the knee of the occupant and has a gas port to receive the gas from the inflator. A length of an edge of the rear panel in a longitudinal direction is longer than a length of the front panel in the longitudinal direction by a predetermined length, the length of the rear panel in the longitudinal direction is equal to the length of the front panel in longitudinal direction due to folding parts provided at both sides of the gas port, and the folding parts are sewn together with edge portions of the front and rear panels by a sewing thread in a state that the folding parts are overlapped on the front panel.

According to another aspect of the present invention, there is provided a method of folding a knee airbag which includes folding a lower portion of the knee airbag perpendicularly to a vertical central axis so that a lower end of the knee airbag is placed on the front panel of the knee airbag, individually folding both sides of the knee airbag toward the vertical central axis, and rolling an upper end portion of the knee airbag toward the lower portion of the knee airbag.

According to the present invention, in the folding the lower portion of the knee airbag perpendicularly to the vertical central axis of the knee airbag, after the lower end of the knee airbag is folded in an upper direction of the knee airbag so that the lower portion of the knee airbag placed on the front panel of the knee airbag is folded at a zigzag pattern, the folded lower end of the knee airbag is folded in half so that the lower end of the knee airbag is directed toward the lower portion of the knee airbag.

According to the present invention, in the individually folding the both sides of the knee airbag toward the vertical central axis, both side ends of the knee airbag are folded in a rear direction in parallel to the vertical central axis so that the both side ends of the knee airbag are placed on the rear panel of the knee airbag.

BRIEF DESCRIPTION OF DRAWINGS

The above and other objects, features and other advantages of the present invention will be more clearly understood from the following detailed description when taken in conjunction with the accompanying drawings, in which:

FIG. 1 is a sectional view showing a knee airbag module for a vehicle according to the present invention;

FIG. 2 is a sectional view showing an initial deployment state of the knee airbag module for the vehicle according to the present invention;

FIG. 3 is a sectional view showing the full inflation state of the knee airbag module for the vehicle according to the present invention;

FIG. 4 is an exploded perspective view showing the knee airbag module for the vehicle according to the present invention;

FIG. 5 is a perspective view showing the assembly of the knee airbag module for the vehicle according to the present invention;

FIG. 6 is a sectional view taken along line VI-VI of FIGS. 5; and

BEST MODE FOR CARRYING OUT THE INVENTION

Figure 7A:
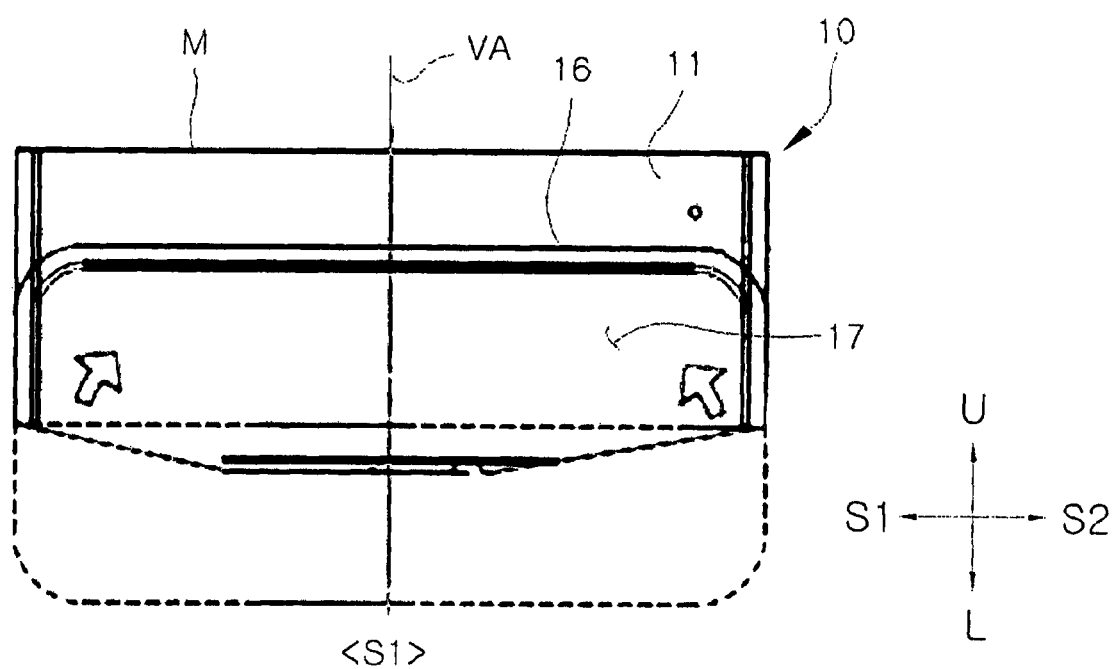
FIGS. 7a to 7f are views showing the procedure of folding the knee airbag module for the vehicle according to the present invention.

Hereinafter, a direction toward a knee K of an occupant is defined as a front direction, and an opposition direction to the knee K of the occupant is defined as a rear direction. A direction toward an upper portion of a horizontal axis HA passing through the central portion of an inflator is defined as an upper direction, and a direction toward a lower portion of the horizontal axis HA is defined as a lower direction.

FIG. 1 is a sectional view showing a knee airbag module 1 for a vehicle according to the present invention, FIG. 2 is a sectional view showing an initial deployment state of the knee airbag module 1 for the vehicle according to the present invention, and FIG. 3 is a sectional view showing the full inflation state of the knee airbag module 1 for the vehicle according to the present invention.

Referring to FIGS. 1 and 3, the knee airbag module 1 includes a knee airbag 10, an inflator 30 to supply gas to the knee airbag 10, and a retainer 70 receiving the knee airbag 10 in a folded state and the inflator 30 and installed in an instrument panel 50.

The instrument panel 50 includes a cover region 55 to cover an opening 71 of the retainer 70 by a tear line 51 provided at one side of an inner surface of the instrument panel 50 corresponding to the knee K of the occupant and a hinge line 53 provided at an opposite side of the inner surface of the instrument panel 50.

If the knee airbag 10 is inflated by gas supplied thereto from the inflator 30, an inner surface of the cover region 55 is pressurized, so that the tear line 51 is torn, and the cover region 55 is rotated about the hinge line 53 to open the side of the inner surface of the instrument panel 50 corresponding to the knee K of the occupant.

The cover region 55 to cover the opening 71 of the retainer 70 may be integrally formed with the instrument panel 50 as described above, or may be formed by using a different member.

After a first half of an outer peripheral portion of the inflator 30 is fitted into a groove part 73 of the retainer 70, and a second half of the outer peripheral portion is supported by a pressing member 80, the inflator 30 is coupled with a bottom part of the retainer 70 through a coupling member 90. The inflator 30 is not limited thereto, but may have various structures and installation states.

A peripheral portion 13c of the gas port 13a of the knee airbag 10, which is described later, is interposed between the retainer 70 and the pressing member 80 so that the peripheral portion 13c may be coupled with the retainer 70 and the pressing member 80 through the coupling member 80.

The knee airbag 10 includes an upper inflation part C1 inflated toward the knee K of the occupant and a lower inflation part C2 inflated toward a leg K1 of the occupant.

FIG. 4 is an exploded perspective view showing the knee airbag module for the vehicle according to the present invention, FIG. 5 is a perspective view showing the assembly of the knee airbag module for the vehicle according to the present invention, and FIG. 6 is a sectional view taken along line VI-VI of FIG. 5.

Referring to FIGS. 4 to 6, the knee airbag 10 is fabricated from a single piece, and includes a front panel 11 directed toward the knee K of the occupant and a rear panel 13 facing the front panel 11, in which the front panel 11 and the rear panel 13 are formed by folding the single piece about a middle part M. Since the middle part M is formed by folding the single piece in half, the middle part M substantially constitutes an upper end portion of the knee airbag 10 (see FIGS. 7a to 7f).

The front panel 11 and the rear panel 13 are not limited to be formed in a single piece, but may be formed by using different members. In other words, the knee airbag 10 may be fabricated from one sheet of a front panel and one sheet of a rear panel.

The rear panel 13 is provided therein with the gas port 13a into which gas from the inflator 30 is introduced. The length of the edge of the rear panel 13 in the upper and lower directions U and L may be longer than the length of the front panel 11 in the upper and lower directions U and L by a predetermined value.

The gas port 13a is provided below a part corresponding to a half of the length of the rear panel 13 in the upper and lower directions U and L. Folding parts 13t are formed at both sides of the gas port 13a of the rear panel 13, so that the length of the rear panel 13 in the upper and lower directions U and L may be substantially equal to the length of the front panel 11 in the upper and lower directions U and L.

If the front panel 11 is overlapped with the rear panel 13 in the state that the folding parts 13t are folded, the folding parts 13t are overlapped on the front panel 11. In this state, if the edges of the knee airbag 10 are sewn by using a sewing thread 15, the edge of the rear panel 13 including the folding parts 13t and the edge of the front panel 11 are sewn together through the sewing thread 15.

The folding parts 13t are more lengthwise extended toward the leg K1 of the occupant in the state that the knee airbag 10 has completely been deployed, thereby constituting the lower inflation part C2 of the knee airbag 10. Accordingly, the leg K1 of the occupant can be more effectively protected.

The folding parts 13t are formed at both sides of the gas port 13a in symmetrical to each other, so that the knee airbag 10 can be more stably deployed when the knee airbag 10 is inflated.

At least one pair of the folding parts 13t are formed about the gas port 13a as shown in FIGS. 4 to 5.

The lower inflation part C2 of the knee airbag 10 may be formed by using an additional panel. For example, the lower inflation part C2 may be linked with the upper inflation part C1 through the sewing thread 15. However, in this case, an amount of used fabric is increased, and a sewing process of the sewing thread is additionally performed, so that the manufacturing cost is increased. The folding parts 13t are integrally formed with the rear panel 13 without the additional panel, so that the manufacturing cost of an airbag can be reduced.

The peripheral portion 13c of the gas port 13a is interposed between the retainer 70 and the pressing member 80 so that the peripheral portion 13c may be coupled with the retainer 70 and the pressing member 80 through the coupling member 90 (see FIG. 1).

In the knee airbag module 1 having the above structure, upon vehicle collision, for example, head-on collision, the inflator 30 operates to introduce gas into the knee airbag 10, so that the inflation of the knee airbag 10 is initiated. As the knee airbag 10 is inflated, the cover region 55 of the instrument panel 50 is pushed and opened, and the knee airbag 10 is inflated out of the instrument panel 50.

Thereafter, as the internal pressure of the knee airbag 10 is gradually increased, and tension generated in the surface direction of the front panel 11 and the rear panel 13 is increased, the folding parts 13t are deployed as the front panel 11 and the rear panel 13, which are overlapped with each other, are spread, and then the folding parts 13t are deployed in the upper and lower directions U and L.

Subsequently, if the internal pressure of the knee airbag 10 is more increased, the folding parts 13t are spread, so that the knee airbag 10 is extended and inflated toward the leg K1 of the occupant, thereby subsequently forming the upper and lower inflation parts C1 and C2.

As a result, the knee airbag 10 not only protects the knee K of the occupant by the upper inflation part C1, but effectively protects the leg K1 of the occupant by the lower inflation part C2.

FIGS. 7a to 7f are views showing the procedure of folding the knee airbag module for the vehicle according to the present invention. In detail, FIGS. 7a to 7f show the procedure of folding the knee airbag 10 having the structure shown in FIGS. 4 to 6.

Referring to FIG. 7a, a lower portion 17 of the knee airbag 10 is folded up perpendicularly to a vertical central axis VA of the knee airbag 10 so that a lower end 16 of the knee airbag 10 is positioned on the front panel 11 and directed in the upper direction U of the knee airbag 10 (step S1).

Figure 7B:
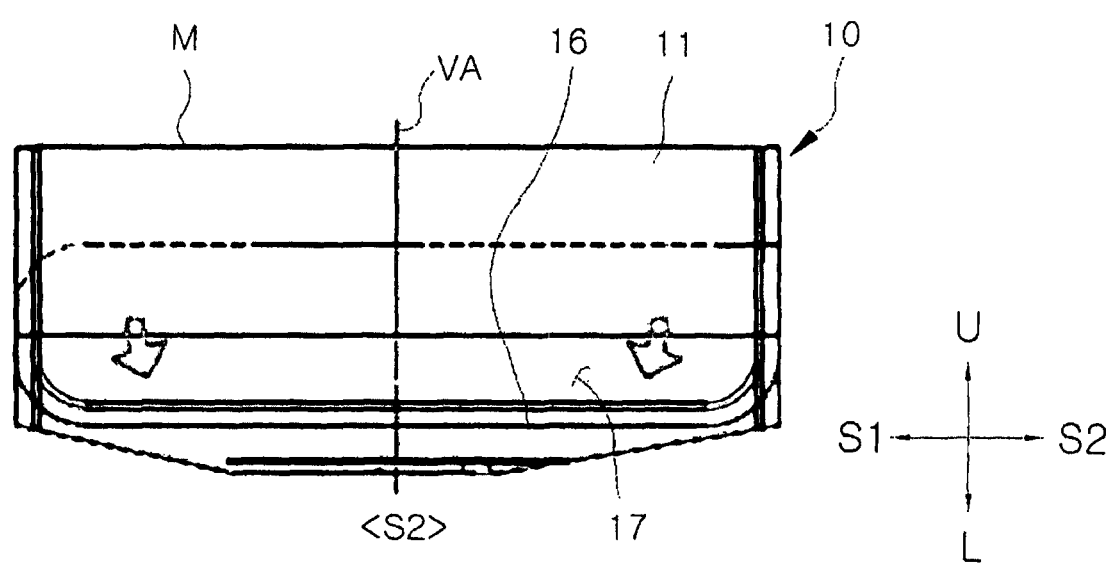

Referring to FIG. 7b, as described above, the lower portion 17 of the knee airbag 10, which has been folded up onto the front panel 110 perpendicularly to the vertical central axis VA of the knee airbag 10, is folded in half, so that the lower end 16 of the knee airbag 10 is directed in the lower direction L of the knee airbag 10 again (step S2).

The lower portion 17 of the knee airbag 10 is folded in a zigzag manner perpendicularly to the vertical central axis VA on the front panel 11 through steps S1 and S2.

The lower portion 17 of the knee airbag 10, which has been folded as described above, is rapidly deployed toward the leg K1 of the occupant in the initial inflation of the knee airbag 10, thereby minimizing time to ensure the minimum space between the instrument panel 50 and the leg K1 of the occupant, so that the leg K1 of the occupant can be rapidly confined. Thereafter, if the knee airbag 10 has been completely inflated, the lower portion 17 of the knee airbag 10 is inflated downwardly to protect the leg K1 of the occupant.

Figure 7C:
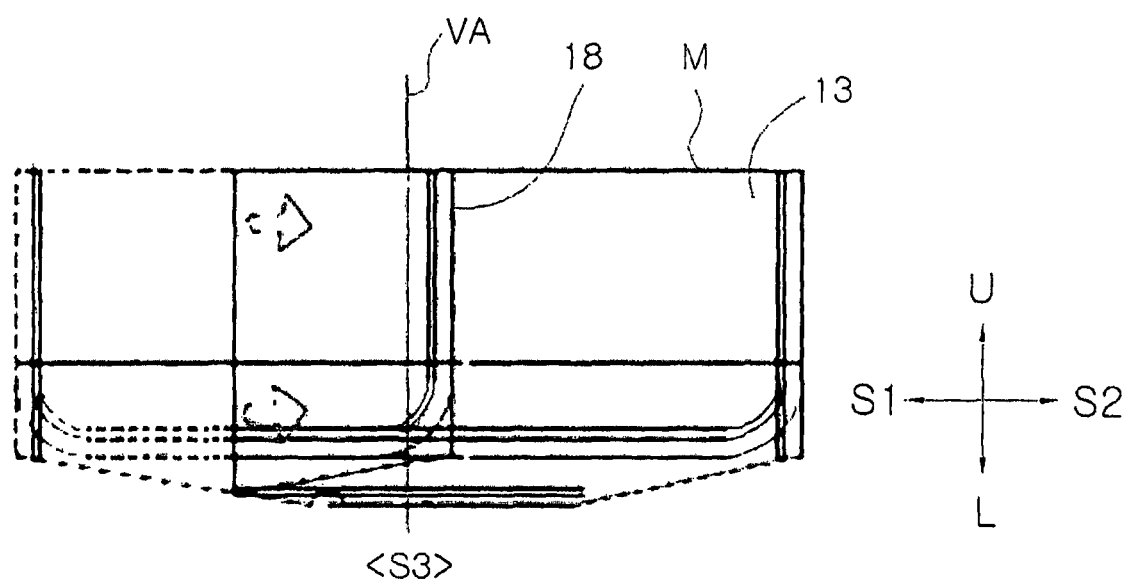

Referring to FIG. 7c, in the state that the lower portion 17 of the knee airbag 10 is folded in a zigzag manner perpendicularly to the vertical central axis VA on the front panel 11 through steps S1 and S2, one side end portion 18 of the knee airbag 10 is folded in such a manner that the side end portion 18 of the knee airbag 10 is positioned on the rear panel 13 of the knee airbag 10 and directed toward the vertical central axis VA in substantially parallel to the vertical central axis VA (step S3).

Figure 7D:
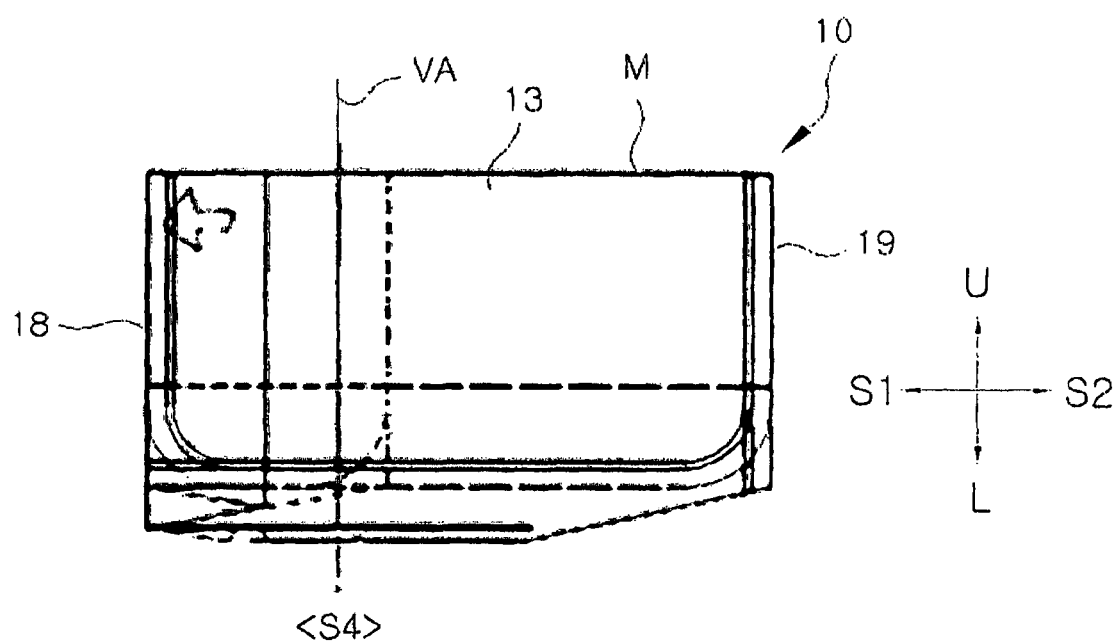

Referring to FIG. 7d, after the side end portion 18 of the knee airbag 10 has been folded in such a manner that the side end portion 18 of the knee airbag 10 is directed toward the vertical central axis VA of the knee airbag 10 in step S3, the folded part is folded in half in such a manner that the side end portion 18 of the knee airbag 10 is directed toward in one side direction S1 again (step S4).

Figure 7E:
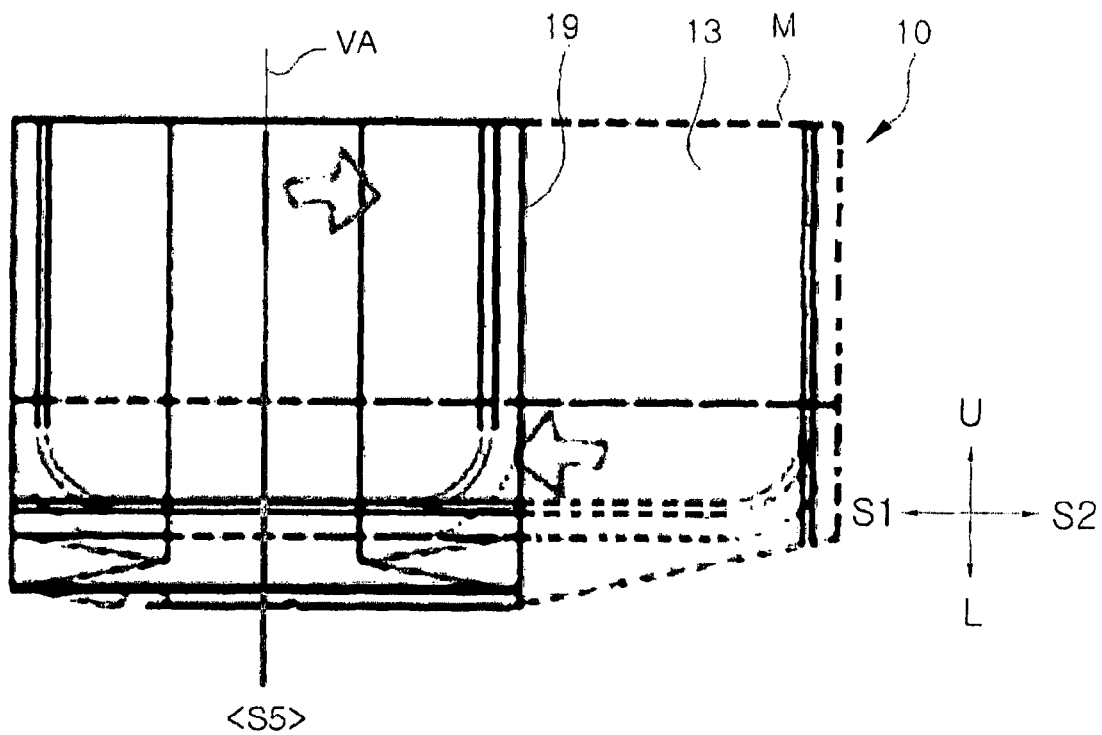

Referring to FIG. 7e, an opposite side end portion 19 is folded in a zigzag manner in parallel to the vertical central axis VA while being folded in a folding direction different from that of the side end portion 18 through the same folding scheme as that of the side end portion 18. Therefore, finally, the opposite side end portion 19 is folded toward in an opposite direction S2 (step S5).

As both sides of the knee airbag 10 are folded toward the vertical central axis VA of the knee airbag 10 in a zigzag manner through the folding scheme shown in steps S3 to S5, the folded side end portions 18 and 19 of the knee airbag 10 are positioned against the leg K1 of the occupant, so that the side end portions 18 and 19 of the knee airbag 10 are deployed in both side directions. Accordingly, when the knee airbag 10 is deployed, the knee airbag 10 is prevented from being deployed and caught between two legs of the occupant.

Figure 7F:
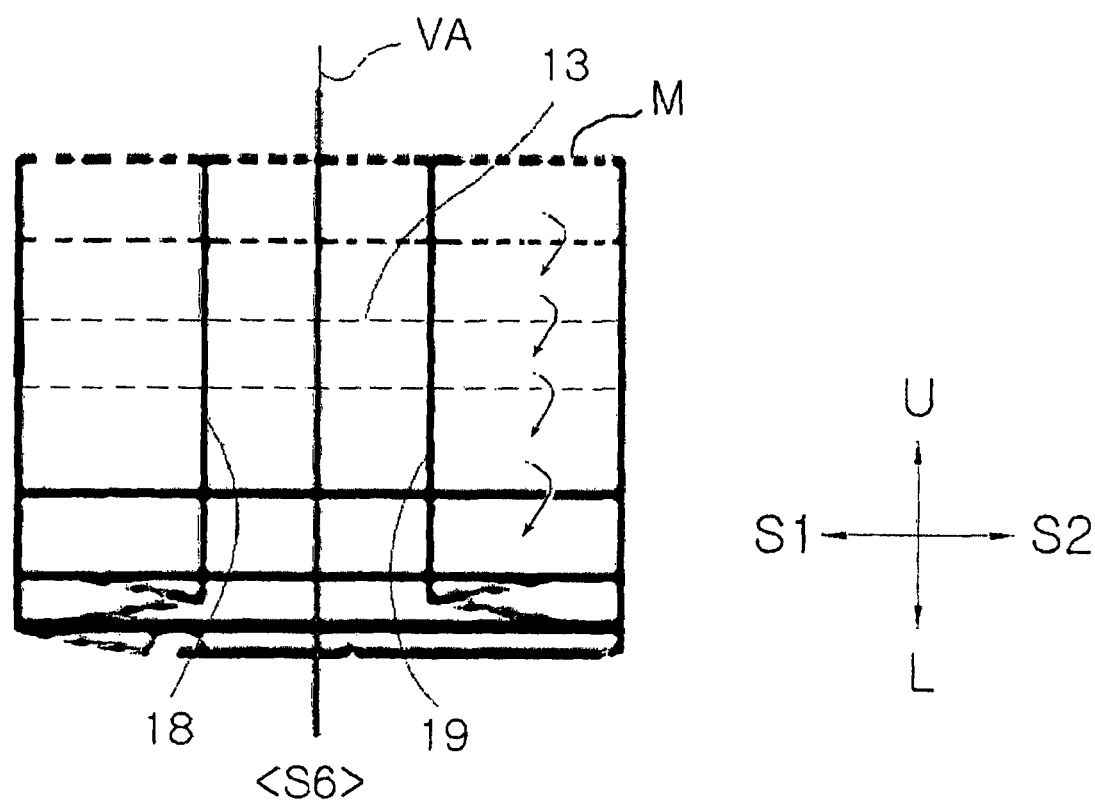

Referring to FIG. 7f, in the state that the both sides of the knee airbag 10 are folded on the rear panel 13 of the knee airbag 10 toward the vertical central axis VA of the knee airbag 10 in a zigzag manner, the upper end portion M is rolled in the lower direction L so that the folding operation has been finished (step S6).

Although a preferred embodiment of the present invention has been described for illustrative purposes, those skilled in the art will appreciate that various modifications, additions and substitutions are possible, without departing from the scope and spirit of the invention as disclosed in the accompanying claims.

Industrial Applicability

As described above, the knee airbag for the vehicle according to the present invention, a leg of an occupant can be effective protected by providing by a leg inflation part which is inflated toward the leg of the occupant.

According to the knee airbag for the vehicle according to the present invention, after a lower portion of the knee airbag at the side of the gas port is folded up in the front direction of the knee airbag, the folded lower portion is folded in half in a lower direction of the knee airbag, thereby minimizing time to ensure the minimum space between the instrument panel and the leg of the occupant when the airbag is initially deployed.

According to the knee airbag for the vehicle according to the present invention, airbag fabric prepared in a single piece is folded in half to form the front and rear panels of the airbag, and the folding parts are formed at both sides of the rear panel in symmetrical to each other, thereby forming upper and lower inflation parts while minimizing an amount of used airbag fabric.

According to the knee airbag for the vehicle according to the present invention, the knee airbag can be stably deployed by forming the folding parts at both sides of the rear panel.

The invention claimed is:

1. A knee airbag for a vehicle the knee airbag comprising:
   a front panel adapted to be directed toward a knee of an occupant, the front panel including a front panel length in a longitudinal direction; and
   a rear panel opposite the front panel and having a gas port to receive a gas from an inflator, the rear panel having a rear panel length along an edge of the rear panel in the longitudinal direction, the rear panel length being longer than the front panel length by a predetermined length, the rear panel length equal to the front panel length due to folding parts provided at both sides of the gas port,
   wherein the folding parts are sewn together with edge portions of the front and rear panels by a sewing thread in a state that the folding parts are overlapped on the front panel.

2. A method of folding a knee airbag, the knee airbag having a front panel adapted to be directed toward a knee of an occupant, the front panel including a front panel length in a longitudinal direction; and a rear panel opposite the front panel and having a gas port to receive a gas from an inflator, the rear panel having a rear panel length along an edge of the rear panel in the longitudinal direction, the rear panel length being longer than the front panel length by a predetermined length, the rear panel length equal to the front panel length due to folding parts provided at both sides of the gas port,
   wherein the folding parts are sewn together with edge portions of the front and rear panels by a sewing thread in a state that the folding parts are overlapped on the front panel,
   the method comprising:
   folding a lower portion of the knee airbag perpendicularly to a vertical central axis such that a lower end of the knee airbag is placed on the front panel of the knee airbag;
   individually folding both sides of the knee airbag toward the vertical central axis; and
   rolling an upper end portion of the knee airbag toward the lower portion of the knee airbag.

3. The method of claim 2, wherein, in the folding the lower portion of the knee airbag perpendicularly to the vertical central axis of the knee airbag, after the lower end of the knee airbag is folded in an upper direction of the knee airbag so that the lower portion of the knee airbag placed on the front panel of the knee airbag is folded in a zigzag pattern, the folded lower end of the knee airbag is folded in half so that the lower end of the knee airbag is directed toward the lower portion of the knee airbag.

4. The method of claim 2, wherein the individually folding the both sides of the knee airbag toward the vertical central axis includes folding both side ends of the knee airbag in a rear direction in parallel to the vertical central axis so that the both side ends of the knee airbag are placed on the rear panel of the knee airbag.

5. A knee airbag in combination with a vehicle, the knee airbag received in a folded state inside a body of the vehicle facing a knee of an occupant and deployable toward the knee of the occupant by gas inflated from an inflator, the knee airbag comprising:

a front panel adapted to be directed toward a knee of an occupant, the front panel including a front panel length in a longitudinal direction; and a rear panel opposite the front panel and having a gas port to receive a gas from an inflator, the rear panel having a rear panel length along an edge of the rear panel in the longitudinal direction, the rear panel length being longer than the front panel length by a predetermined length, the rear panel length equal to the front panel length due to folding parts provided at both sides of the gas port, wherein the folding parts are sewn together with edge portions of the front and rear panels by a sewing thread in a state that the folding parts are overlapped on the front panel.

* * * * *